April 27, 1926.
C. C. TOMKINSON
PIPE HANGER
Filed Oct. 20, 1922
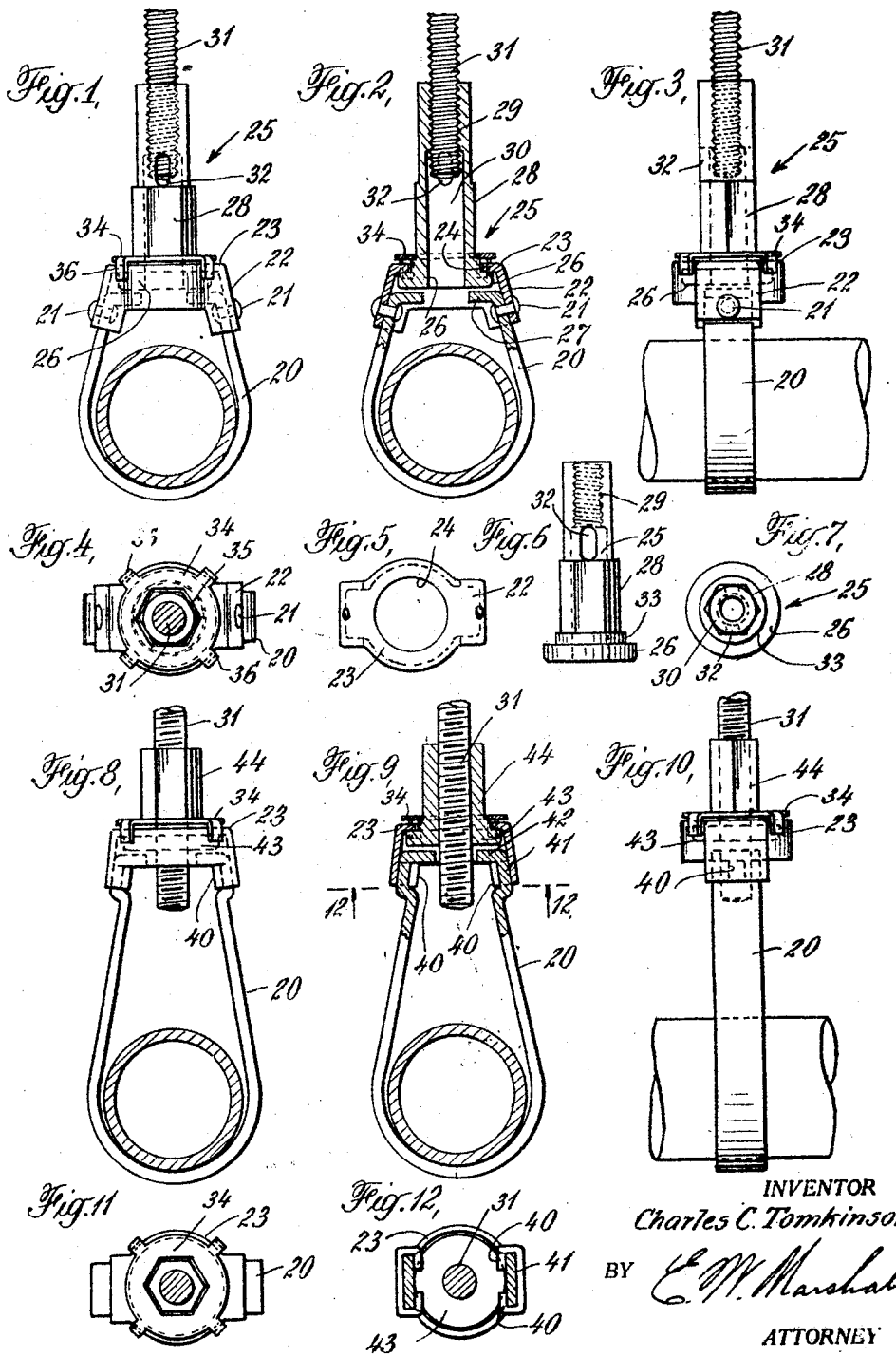
INVENTOR
Charles C. Tomkinson
BY E. W. Marshall
ATTORNEY Patented Apr. 27, 1926.

1,582,358

UNITED STATES PATENT OFFICE.

CHARLES C. TOMKINSON, OF PLAINFIELD, NEW JERSEY, ASSIGNOR TO JOHN EDWARD OGDEN, OF MOUNTAINVILLE, NEW YORK.

PIPE HANGER.

Application filed October 20, 1922. Serial No. 595,730.

*To all whom it may concern:*

Be it known that I, CHARLES C. TOMKINSON, a citizen of the United States, and a resident of Plainfield, county of Union, and State of New Jersey, have invented certain new and useful Improvements in Pipe Hangers, of which the following is a specification.

This invention relates to supports and particularly to supports of the type known as pipe hangers used for suspending overhead pipe lines.

One of the objects of the invention is to provide a pipe hanger so constructed and arranged as to be adjustable toward or from the ceiling, wall or other fixed support to which it is attached after the hanger has been assembled and mounted in position.

Another object of the invention is to provide a hanger so constructed that the parts will be securely held in position after they have been adjusted.

Another object of the invention is to provide a pipe hanger so constructed and arranged that most of the parts thereof can be formed from sheet metal stampings thereby providing an inexpensive construction.

Another object of the invention is to provide a pipe hanger having the carrier for the pipe swiveled to the member on which the carrier is supported.

Another object of the invention is to provide a hanger that can be economically manufactured and easily installed.

Further objects of the invention will appear from the following description taken in connection with the drawings which form a part of this application and in which, Fig. 1 is an elevational view showing one form of pipe hanger constructed in accordance with the invention.

Fig. 2 is a view similar to Fig. 1 but showing the sleeve, saddle and end portions of the carrier in section.

Fig. 3 is a side elevation of the construction shown in Fig. 1.

Fig. 4 is a top plan view of the construction shown in Fig. 1.

Fig. 5 is a top plan view of the saddle member.

Fig. 6 is an elevational view of the sleeve.

Fig. 7 is a top plan view of the sleeve.

Fig. 8 is an elevational view similar to Fig. 1 but illustrating another form of the invention.

Fig. 9 is an elevational view showing the sleeve, saddle member and upper portion of the carrier in section.

Fig. 10 is a side elevational view taken at right angles to Fig. 8.

Fig. 11 is a top plan view of the construction shown in Fig. 8, and

Fig. 12 is a transverse sectional elevation taken substantially on line 12—12 of Fig. 9.

The invention briefly described consists of a pipe hanger comprising three main parts namely a carrier, saddle member, and an element carried by the saddle member and adapted to be connected to the rod or support from which the hanger is suspended. The saddle member is rigidly connected to the upper ends of the carrier strap and in the embodiments of the invention shown a sleeve extends upwardly from the saddle member and has an enlarged lower end confined within the saddle member. Before the device is connected to the supporting member, the sleeve is supported from below by the inturned upper ends of the carrier strap. The sleeve or equivalent element is swiveled in the saddle member and means is provided for retaining the sleeve against rotation relative to the saddle member and carrier after the hanger has been properly adjusted. This retaining member has portions engageable with the sleeve and with the saddle member and is movable to a position in which the portions engageable with the saddle will be free from engagement therewith thereby permitting rotation of the sleeve and adjustment of the hanger. Further details of the invention will appear from the following description.

As illustrated in the drawings the carrier consists of a single strap 20 secured by rivets 21 or other suitable securing means adjacent the upper ends of the strap to downturned portions 22 of a saddle member 23.

The saddle member has formed therein a central opening 24 through which extends a sleeve 25 having an enlarged portion or head 26 at its lower end positioned within the saddle member 23. The sleeve and head 26 are supported from below by inturned ends 27 of the carrier strap 20.

In the particular embodiment of the invention shown in Figs. 1–7 inclusive, the sleeve 25 is elongated and has a hexagonal outer surface throughout a portion of its length as shown at 28. The sleeve is also internally threaded as shown at 29 for a portion of its length and is longitudinally bored as shown at 30 throughout the remaining portion to permit the threaded shank 31 of a supporting rod or bolt to enter the sleeve. In order to permit the user to see the threaded portion 31 of the bolt and to determine the position of adjustment of the sleeve thereon, the sleeve 25 has formed therein openings 32.

The sleeve 25 has formed therein intermediate the hexagonal portion 28 and the head 26 an annular substantially cylindrical portion 33 and this portion 33 is disposed within the opening 24 of the saddle member 23 thereby providing a swivel connection between the sleeve and the saddle.

In order to prevent relative rotation between the sleeve and the saddle after the sleeve has been properly adjusted a locking member or plate 34 is slidably mounted on the sleeve and has a hexagonal opening 35 corresponding in shape to the hexagonal portion 28 of the sleeve. The locking member 34 also has formed thereon downwardly extending lugs 36 engageable with the saddle member for preventing relative movement between the sleeve and locking member and the saddle member. When the user desires to adjust the sleeve the member 34 is lifted until the lugs 36 are free from the saddle member.

The construction shown in Figs. 8–12 inclusive is similar to that shown in Figs. 1–7 inclusive. In the construction shown in Figs. 8–12 however, the saddle member 23 is provided with inturned tabs 40 engaging the carrier strap 20 at portions 41 adjacent the ends thereof. The ends 42 of the strap are inturned as shown in Fig. 9 and extend under the head 43 of the sleeve 44. The sleeve 44 is similar in construction to the sleeve 25 but is threaded throughout its length and for this reason the carrier strap is made longer to permit the threaded rod or bolt 31 to pass downwardly through the sleeve and into the carrier.

The same locking member 34 is used in the embodiment of the invention shown in Figs. 8–12 as was used with the other form of the invention.

Although in both embodiments of the invention a threaded sleeve is shown as carried by the saddle member in order to permit adjustment of the hanger at the lower end of the supporting rod 31 or bolt, it will be understood that a headed bolt can be used in the place of the sleeve and the necessary adjustments of the hanger can be made at the upper end of the supporting member or bolt. Or the hole through the sleeve may be of sufficient diameter to clear the threaded shank of a bolt, and a nut may be screwed onto the lower end of the bolt under the sleeve.

Although certain specific embodiments of the invention have been particularly shown and described, it will be understood that the invention is capable of further modification and that further changes in the construction and in the arrangement of the various co-operating parts may be made without departing from the spirit or scope of the invention as expressed in the following claims.

What I claim is:

1. A pipe hanger comprising a carrier, a saddle member secured thereto adjacent the ends of the carrier, and a sleeve extending through the saddle member and having an enlarged end engaging the under surface thereof, said carrier ends extending under the enlarged portion of the sleeve.

2. A pipe hanger comprising a carrier, a saddle member secured thereto adjacent the ends of the carrier, and a sleeve extending through and swiveled in the saddle member and having an enlarged end engaging the under surface thereof, said carrier ends extending under the enlarged portion of the sleeve.

3. A pipe hanger comprising a carrier, a saddle member secured thereto, a sleeve swiveled in said saddle member and separate means loosely mounted on and engageable with the sleeve and saddle member for securing said elements against relative rotation.

4. A pipe hanger comprising a carrier, a saddle member secured thereto, a sleeve swiveled in said saddle member and separate, vertically movable, loosely mounted means engageable with the sleeve and saddle member for securing said elements against relative rotation.

5. A pipe hanger comprising a carrier, a saddle member, a sleeve swiveled in said saddle member and loosely mounted means engageable with the sleeve and saddle member for securing said elements against relative rotation, said means being movable out of engagement with the saddle member to permit rotation of the sleeve.

6. A pipe hanger comprising a carrier, a saddle member secured thereto, a threaded sleeve swiveled in said saddle member and means separate from but engageable with the sleeve and saddle member for securing said elements against relative rotation.

7. A pipe hanger comprisng a carrier, a saddle member secured thereto, a sleeve swiveled in said saddle member and having a portion of non-circular section above said member and means having an opening of corresponding section mounted on said sleeve and having portions engageable with the saddle member to secure the sleeve against rotation relative to said saddle member.

8. A pipe hanger comprising a carrier, a saddle member secured thereto, a sleeve swiveled in said saddle member and having a portion of non-circular section above said member and means having an opening of corresponding section mounted on said sleeve and having lugs engageable with the saddle member to secure the sleeve against rotation relative to said saddle member.

9. A pipe hanger comprising a carrier, a saddle member secured thereto, a sleeve swiveled in said saddle member and having a portion of non-circular section above said member and vertically movable means having an opening of corresponding section mounted on said sleeve and having portions engageable with the saddle member to secure the sleeve against rotation relative to said saddle member.

10. A pipe hanger comprising a carrier, a saddle member secured thereto, a sleeve swiveled in said saddle member and having a portion of non-circular section above said member and means having an opening of corresopnding section mounted on said sleeve and having portions engageable with the saddle member to secure the sleeve against rotation relative to said saddle member, said means being movable to a position in which the portions thereof are out of engagement with the saddle member, thereby permitting rotation of the sleeve.

11. A pipe hanger comprising a carrier strap, a saddle member connected to the end thereof and having a downwardly extending portion forming a housing, a threaded supporting member extending through said saddle member and having an enlarged portion confined therein and means mounted on said supporting member and engageable with and adapted to rest on said saddle member for securing the supporting member against rotation.

In witness whereof, I have hereunto set my hand this 19th day of October, 1922.

CHARLES C. TOMKINSON.